H. E. DECKEBACH.
PROCESS OF REMOVING ALCOHOL FROM AND PURIFYING BEER.
APPLICATION FILED APR. 11, 1908.

1,017,086.

Patented Feb. 13, 1912.

Witnesses
A. McCormack
C. W. Miles

Inventor
Henry E. Deckebach
Walter F. Murray
Attorney

UNITED STATES PATENT OFFICE.

HENRY E. DECKEBACH, OF CINCINNATI, OHIO.

PROCESS OF REMOVING ALCOHOL FROM AND PURIFYING BEER.

1,017,086.  Specification of Letters Patent.  Patented Feb. 13, 1912.

Application filed April 11, 1908. Serial No. 426,502.

*To all whom it may concern:*

Be it known that I, HENRY E. DECKEBACH, a citizen of the United States of America, and resident of Cincinnati, county of Hamilton, State of Ohio, have invented certain new and useful Improvements in Processes of Removing Alcohol from and of Purifying Beer, of which the following is a specification.

Figure 1:
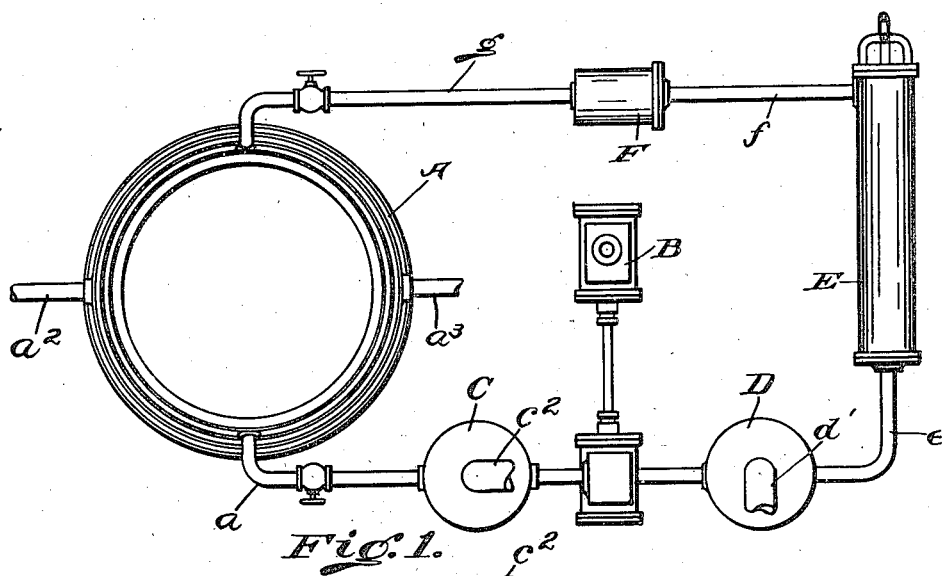
Figure 2:
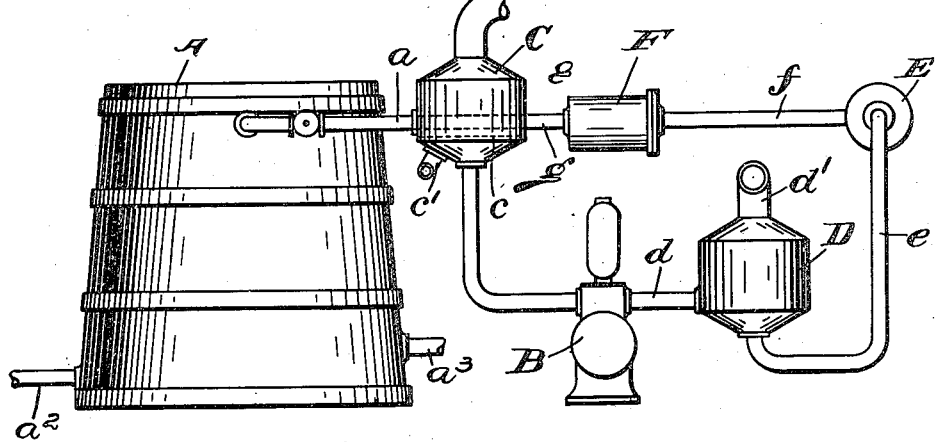

The object of my invention is a simple and efficient process for removing alcohol, albuminoids, and impurities from beer and of aerating and cooling it. This object is attained by the steps described in the specification and by the use of an apparatus such as is illustrated in the figures of the drawing, in which, Figure 1 is a plan view of an apparatus used in carrying out my process. Fig. 2 is a side elevation of the same.

I will now describe the process first as used upon a wort which has undergone a partial fermentation.

Wort at a temperature of about forty-five degrees Fahrenheit is drawn into the fermenting tub, A, from the hop-jack, where it has received about twelve per cent. extract. In the tub it receives its yeast and the fermentation which then commences is allowed to proceed to any degree desired, such as until it contains about six per cent. extract. It will then be found to have risen to about fifty-two degrees Fahrenheit. The beer is then drawn off from the tub, A, through pipe, $a$, by the pump, B. In the pipe, $a$, between the tub, A, and the pump, B, the vessel, C, is interposed. Vessel, C, below the point at which the pipe, $a$, enters, has a strainer, $c$, below which a pipe, $c'$, enters the vessel, C. Through the pipe, $c'$, treated air under pressure and at a temperature of one hundred and forty degrees Fahrenheit is injected. This heated air passes up through the beer as it flows upon the strainer, $c$, absorbs the alcohol in the beer and passes off through the pipe $c^2$. This alcohol-laden air may be allowed to escape into the atmosphere, or may be led from the pipe, $c^2$, into a condenser for recovering the alcohol. Treated air is that which has been passed through mercury. The beer is forced by the pump, B, through pipe, $d$, into a cold air vessel, D, thence through pipe, $e$, through cooler, E, thence through pipe, $f$, through strainer, F, thence through pipe, $g$, back into the fermenting tub, A. A pipe, $d'$, enters the vessel, D, to supply compressed air of a temperature of about thirty-two degrees Fahrenheit thereto. The pressure of the cold air is made somewhat greater than the pressure of the liquid entering the vessel, D, from the pump. The purpose of adding this treated, cold air to the liquid is to assist in clarifying it when the liquid is drawn from the fermenting tub to the chip cask, not shown. Because it has been cooled in the vessel, D, the beer when it enters vessel, A, will cool its contents and assist in precipitating albuminoids. In passing through the cooler, E, the beer is lowered to a temperature of about twenty-nine degrees Fahrenheit. The strainer, F, retains any yeast cells, albuminoids, or other impurities. The circulation of the beer is continued until the liquid in the fermenting tub has reached a temperature of about thirty-two and a half degrees Fahrenheit.

When the process is used upon a beer which has undergone what is termed a "full fermentation", before withdrawing the beer through the pipe, $a$, as aforedescribed, the fermentation is allowed to proceed until a test of the beer indicates that there is remaining about two and one-half per cent. extract therein.

After undergoing the process, the beer is withdrawn from the tub, A, by means of pipe, $a^3$, and the yeast may be withdrawn through pipe, $a^2$. By this process the alcohol in the beer may be reduced to less than one-half of one per cent.

What I claim is:

The process of treating beer consisting of withdrawing it from the fermenting tub, passing heated, compressed air through it, carrying off the air, sending the beer through a cooler, thence carrying it through a strainer, returning it from the strainer to the fermenting tub, and continuing the circulation until the beer has been lowered to the desired temperature.

HENRY E. DECKEBACH.

Witnesses:
WALTER F. MURRAY,
AGNES McCORMACK.